US008457948B2

(12) United States Patent
Waksberg et al.

(10) Patent No.: US 8,457,948 B2
(45) Date of Patent: Jun. 4, 2013

(54) SYSTEMS AND METHODS FOR AUTOMATED CONTENT GENERATION

(75) Inventors: Rene Waksberg, Verdun (CA); Donny Hsu, Montreal (CA); Patrick Bradley, St-Basile-le-Grand (CA)

(73) Assignee: Expedia, Inc., Bellevue, WA (US)

( * ) Notice: Subject to any disclaimer, the term of this patent is extended or adjusted under 35 U.S.C. 154(b) by 357 days.

(21) Appl. No.: 12/779,902

(22) Filed: May 13, 2010

(65) Prior Publication Data

US 2011/0282649 A1 Nov. 17, 2011

(51) Int. Cl.
*G06F 17/20* (2006.01)
*G06F 17/27* (2006.01)
*G06F 17/30* (2006.01)

(52) U.S. Cl.
USPC ............. 704/8; 704/1; 707/748; 707/749

(58) Field of Classification Search
USPC ............. 704/1–8, 9–10; 707/705, 748–751, 707/828–831, E17.001–E17.143
See application file for complete search history.

(56) References Cited

U.S. PATENT DOCUMENTS

| | | | | |
|---|---|---|---|---|
| 5,581,664 | A * | 12/1996 | Allen et al. | 706/46 |
| 6,076,088 | A * | 6/2000 | Paik et al. | 1/1 |
| 6,182,092 | B1 * | 1/2001 | Francis et al. | 715/227 |
| 6,466,940 | B1 * | 10/2002 | Mills | 1/1 |
| 7,492,949 | B1 * | 2/2009 | Jamieson | 382/217 |
| 7,774,388 | B1 * | 8/2010 | Runchey | 707/811 |
| 7,930,169 | B2 * | 4/2011 | Billerey-Mosier | 704/9 |
| 8,131,540 | B2 * | 3/2012 | Marchisio et al. | 704/9 |
| 8,150,676 | B1 * | 4/2012 | Kaeser | 704/1 |
| 2002/0016800 | A1 * | 2/2002 | Spivak et al. | 707/523 |
| 2003/0182163 | A1 * | 9/2003 | Tice et al. | 705/3 |
| 2004/0044518 | A1 * | 3/2004 | Reed et al. | 704/8 |
| 2005/0071150 | A1 * | 3/2005 | Nasypny | 704/9 |
| 2005/0210008 | A1 * | 9/2005 | Tran et al. | 707/3 |
| 2005/0267871 | A1 * | 12/2005 | Marchisio et al. | 707/3 |
| 2006/0015324 | A1 * | 1/2006 | Pan et al. | 704/9 |
| 2006/0047649 | A1 * | 3/2006 | Liang | 707/4 |
| 2006/0047656 | A1 * | 3/2006 | Dehlinger et al. | 707/6 |
| 2006/0178868 | A1 * | 8/2006 | Billerey-Mosier | 704/9 |
| 2007/0198250 | A1 * | 8/2007 | Mardini | 704/9 |
| 2007/0209004 | A1 * | 9/2007 | Layard | 715/731 |
| 2008/0046231 | A1 * | 2/2008 | Laden et al. | 704/8 |
| 2008/0065596 | A1 * | 3/2008 | Shadmon et al. | 707/2 |
| 2009/0070099 | A1 * | 3/2009 | Anisimovich et al. | 704/5 |
| 2009/0070322 | A1 * | 3/2009 | Salvetti et al. | 707/5 |
| 2009/0192968 | A1 * | 7/2009 | Tunstall-Pedoe | 706/47 |
| 2009/0210411 | A1 * | 8/2009 | Murata et al. | 707/5 |

(Continued)

*Primary Examiner* — Pierre-Louis Desir
*Assistant Examiner* — David Kovacek
(74) *Attorney, Agent, or Firm* — Knobbe, Martens, Olson & Bear LLP

(57) ABSTRACT

A content generation service is described that generates content for electronic documents in different languages based upon templates. The templates may include paragraph templates composed of sentence types including sentence templates. The sentence templates may further include variables having corresponding attributes. Each of the paragraph templates, sentence templates, and attributes may be hierarchically organized. The content generation service may obtain data describing an item of interest, such as a travel item. The obtained data may further specify a document language, section and paragraph for which content is to be generated. Content is generated for variables in hierarchical order, with higher ranked paragraphs considered first. Within the highest ranked paragraph, a sentence type is selected and the variables within the highest ranked sentence template of the sentence type are considered. Sentence templates which contain attributes matched by the data obtained for the item of interest are added to the generated document.

34 Claims, 12 Drawing Sheets

U.S. PATENT DOCUMENTS

2009/0327285 A1* 12/2009 Mansfield et al. ................ 707/5
2010/0049772 A1*  2/2010 Jing et al. ...................... 707/776
2011/0022494 A1*  1/2011 Lutnick et al. ............. 705/26.25
2011/0282649 A1* 11/2011 Waksberg et al. ................ 704/8
2011/0320191 A1* 12/2011 Makeyev ........................ 704/9
2012/0109631 A1*  5/2012 Gopal et al. ..................... 704/3

* cited by examiner

SUMMARY

THE XYZ HOTEL IS LOCATED IN ABC, USA. THE HOTEL IS LOCATED AT 12345 XYZ STREET.

HAMBURGERS MAY BE OBTAINED FROM LOCAL RESTAURANTS

THE XYZ HOTEL ALSO OFFERS AN AQUATIC COMPLEX INCLUDING A POOL AND SPA FOR THE ENJOYMENT OF ITS GUESTS. THE AQUATIC COMPLEX IS OPEN BETWEEN THE HOURS OF 6AM TO 10PM

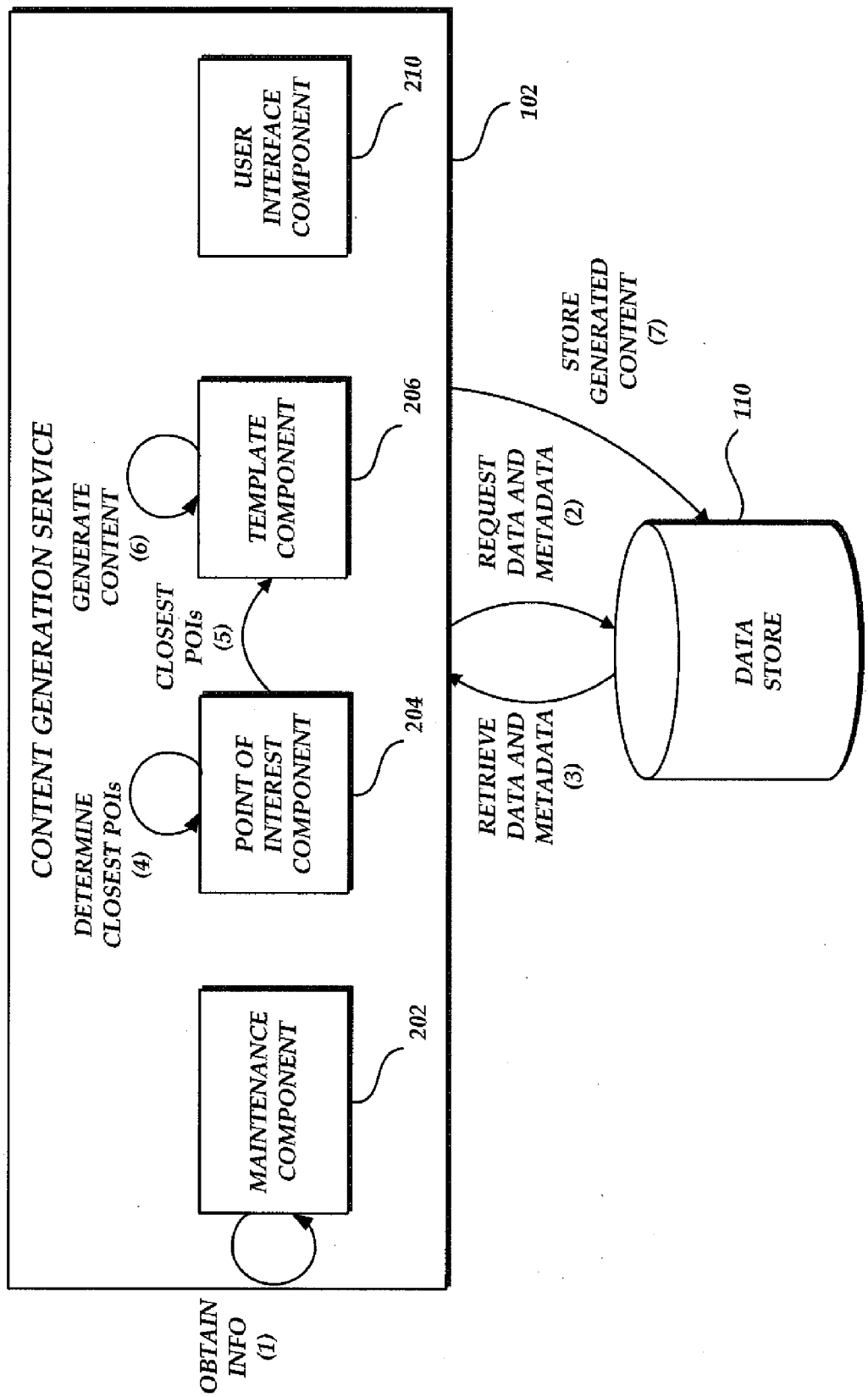

SYSTEMS AND METHODS FOR AUTOMATED CONTENT GENERATION

BACKGROUND

Computing devices and computing networks are frequently employed by users to obtain information and to make purchases. For example, a user may search for, review, and share information regarding items of interest from a network-based information service using his or her personal computing device. In another example, a user may purchase an item of interest from a network-based retailer using his or her personal computing device. Furthermore, network-based services may enable a user to perform these task in the comfort of their home or office and at his or her own pace and convenience.

To accommodate users from a variety of countries, network-based service providers often provide their respective network-based services in a variety of languages. However, translating the content within a network-based service into a variety of languages may be time consuming and costly. Furthermore, as the content is updated, additional translations may be required, incurring further costs. Therefore, even when content is available in certain languages, it may be difficult for network-based services to maintain this content in other desired languages.

BRIEF DESCRIPTION OF THE DRAWINGS

FIG. 3D is an illustration of content generated for the templates of FIGS. 3A-3C;

FIG. 4A is a block diagram of the operating environment of FIG. 1 illustrating the content generation service automatically initiating a process to generate content regarding an identified item of interest;

DETAILED DESCRIPTION

Figure 1:
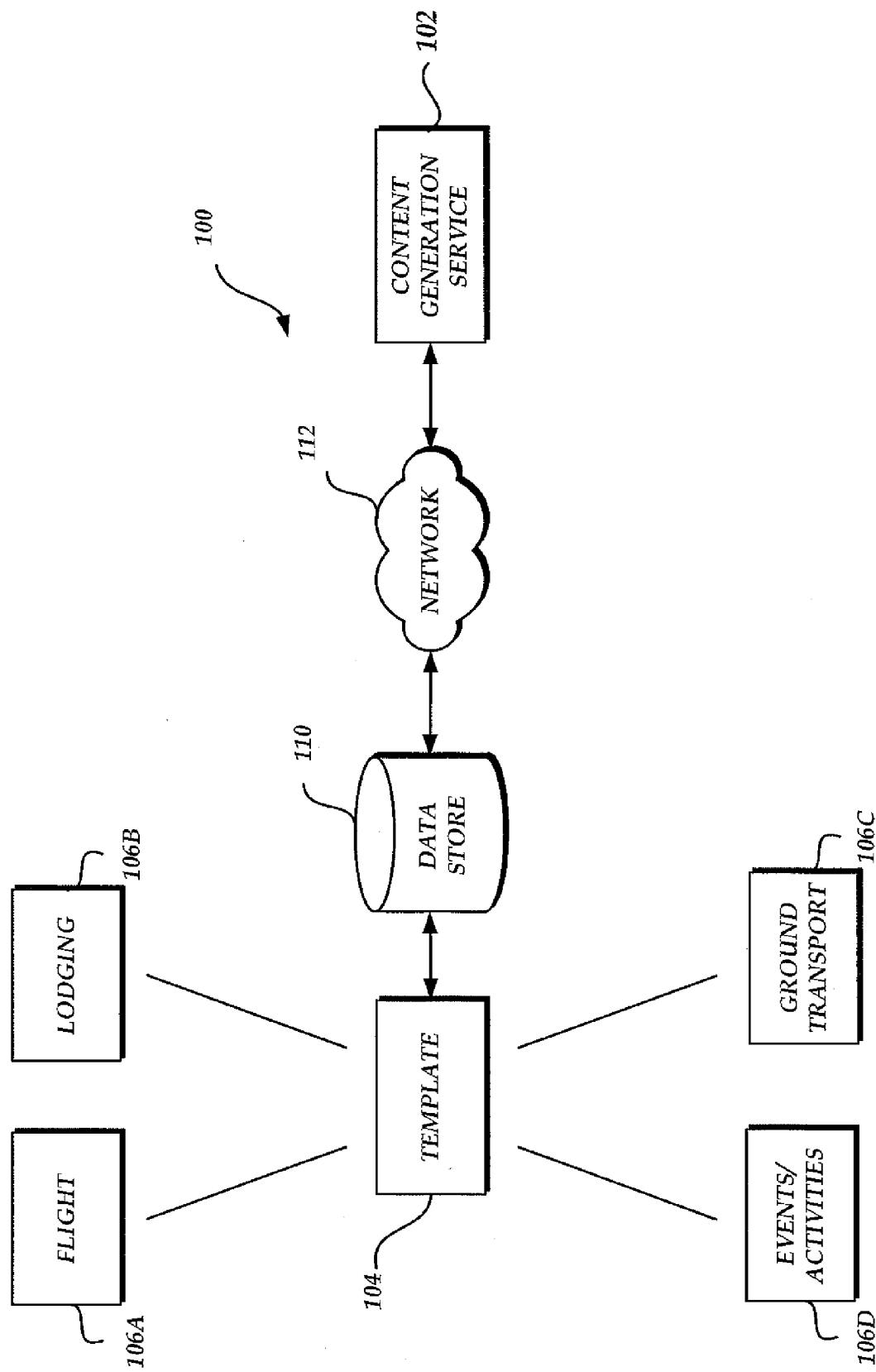
FIG. 1 is a block diagram depicting an illustrative operating environment in which a content generation service prepares content regarding identified items of interest based upon a hierarchically organized template.

Embodiments of the present disclosure relate to generating content regarding an item of interest and storing the generated content for later recall and use, for example, by a network-based service. To this end, a content generation service is provided that generates content for electronic documents in different languages based upon templates. The item of interest may be anything a person can perceive or imagine and may include, but is not limited to, objects, places, and events. In certain embodiments, the item of interest may include travel items, such as flights, lodging, ground transportation, and activities.

As described in greater detail below, the content generation service may employ templates to automatically generate content for an item of interest. The templates may be organized on the level of paragraphs, sentence types, sentences, and variables. Each paragraph of a document may be generated by consideration of one or more paragraph templates. Each of the paragraph templates may include one or more sentence types that include one or more sentence templates. The sentence templates may further include one or more variables that describe the item of interest. Variables may additionally include one or more attributes. Each of the paragraph templates, sentence templates, and attributes may be, respectively, hierarchically ranked.

Selected sentence types may be further designated as required. A required sentence type is considered mandatory for inclusion in its respective paragraph template. If content is not generated for a required sentence type, the paragraph template in which the required sentence type is found will be omitted from the generated content, irrespective of any other content generated for the paragraph template.

In certain embodiments, only one of the possible paragraph templates and sentence templates may be employed in their respective paragraph and sentence type for content generation. Which of the paragraph and sentence templates is employed to generate content regarding an item of interest is determined in an evaluation process that identifies variables that are satisfied by the item of interest.

The evaluation process may begin by identifying the item of interest and by further obtaining data regarding the item. In one embodiment, the obtained data may include information describing the item of interest and the relationship between the information and one or more paragraph templates. In this manner, paragraph templates appropriate to the item of interest may be identified.

In one aspect, the obtained data may include metadata which specifies how the obtained data relates to paragraph templates. For example, the metadata may specify information such as the language of the paragraph templates, the section of the generated content to which the paragraph templates pertain, and the paragraph of the generated content to which paragraph templates pertain. By obtaining this metadata information, the content generation service may identify and retrieve one or more paragraph templates appropriate to the paragraph for which content generation is to be performed.

In another aspect, the obtained data may include structured information describing the item of interest. The structured information may include, but is not limited to, a table or database which includes entries corresponding to one or more of the attributes of the variables within the sentence templates. For example, assuming the item of interest is a lodging property, a sentence template for the lodging property may include a variable called "water." In certain embodiments, the variable of the sentence template may further specify that the attribute associated with the variable "water" is "pool."

Whether the variable of a sentence template is satisfied by the property of interest is determined by comparing the attribute variable and attributes within the structured data. If a variable attribute is found to match an attribute within the structured data, the variable is satisfied by the item of interest. For example, using the example above, if the structured data for a lodging property indicates that the property possesses the attribute "pool," the water variable of the sentence template is satisfied.

Upon identifying a match, the variable within the sentence template may be replaced by content for the item of interest. In certain embodiments, the content may be the name of the attribute itself. In other embodiments, the content may be an attribute value associated with the attribute. For example, an attribute "pool" may have an attribute value "Olympic-sized pool."

In circumstances where a variable appears more than once within a sentence template, the sentence template may be satisfied only if as many attributes of the variable are satisfied as there are instances of the variable within the sentence template. Attributes of the variable are evaluated in ranked order with respect to the structured information of the item of interest. For example, assuming a variable is repeated twice within a sentence template and the variable has three associated attributes, the variable may be satisfied if two of the three attributes are matched with the attributes of the structured information.

Should the item of interest fail to satisfy at least one variable of the sentence template under consideration, the sentence template is not satisfied. For example, continuing the example above, if the item of interest is a lodging property and the sentence template includes a variable "water" having an attribute "pool," a lodging property without an attribute of "pool" within its structured information would not satisfy the sentence template. Therefore, the sentence template under consideration would not be included in the generated content, regardless of other content generated for the sentence template under consideration.

Variables may further be designated as conditional variables. A conditional variable is a variable which requires that certain conditions are met before the variable is satisfied. For example, assume that a sentence template for a lodging property includes a conditional variable of "water" having attributes "pool," "lake," and "ocean." The conditions placed upon the water variable may be that, in order for the water variable to be satisfied, the structured information for the lodging property must possess at least one of "pool," "lake," and "ocean" attributes. If at least one of these conditions is satisfied, content indicating that the lodging property is near a body of water may be added to the generated document. Note that the conditional variable operates differently from other variables in that the conditional variable is not replaced by content such as an attribute or an attribute value when the conditional variable is satisfied. Rather, satisfying the conditional variable may result in generation of different content pertaining to the conditional variable.

After obtaining the data and template for the item of interest, the content generation service may employ the template and obtained data to generate content. The content generation service begins generating content by considering the highest ranked paragraph template within the paragraph under consideration. Within this highest ranked paragraph template, any required sentence types are considered. For example, if the item of interest is a lodging property, a sentence type including sentence templates regarding the contact information (e.g., name, address, telephone number, etc) of the property may be designated as required while a sentence template including sentence templates regarding on-site dining options may be designated as not required. In the event that more than one required sentence type is present within a paragraph template, the required sentence types may be evaluated in any order. If no required sentence types are present within a paragraph template, the sentence types may be evaluated in any order. Within the selected sentence type, the sentence templates may be considered in ranked order.

Upon selecting the sentence type and highest ranked sentence template for content generation consideration, the variables within the highest ranked sentence template may be evaluated in any order, as discussed above. In the event that a variable possesses more than one attribute, the highest ranked attribute is considered first. If no match is found to the highest ranked attribute, the next highest ranked attribute may be checked for a match with the structured information for the item of interest. This process may continue until a match is identified or until all attributes of the variable have been reviewed. If the structured data of the item of interest is not found to match any attribute of the variable, the variable is not satisfied. This evaluation process may be performed for each variable within the sentence template under consideration until all variables have been evaluated.

The content generation system may then consider any remaining sentence templates within the sentence type, in ranked order, until a sentence template is found which satisfies the item of interest. If a satisfying sentence template is identified, the variables of the satisfying sentence template may be replaced with their respective attributes or attribute values and the satisfied sentence template is provided as generated content. The content generation system may then continue content generation with another sentence type.

If, no satisfying sentence template is identified for a sentence type, though, the sentence type is determined to fail. In general, the content generation system may then move to the next sentence type within the paragraph template under consideration for further content generation. However, if the sentence type under consideration is a required sentence type, the entire paragraph in which the sentence type resides is determined to fail and is omitted from the generated content.

Alternatively, if there are no additional sentence types to be considered for content generation within the paragraph template, the content generation system may continue the content generation process with other paragraphs of the section. In further alternatives, if no paragraphs remain for content generation, the content generation process may continue with other sections of the document or stop content generation.

With reference to FIG. 1, an illustrative operating environment 100 is shown, including a content generation service 102 for generating content regarding an item of interest using one or more templates 104. The item of interest may be an object (such as an article of manufacture, plant, animal or person), a place (such as a building, park, business, landmark or address), or an event (such as a game, concert or movie). In certain embodiments, the object of interest may be a travel item. Examples of travel items may include any transportation goods or services, such as flights 106A, lodging 106B, land or sea-based transportation 106C (e.g., automobiles, buses, trains, cruises and the like), or other goods or services related to activities 106D, such as concerts, sporting events, amusement parks and the like. In certain embodiments discussed below, reference may be made to the item of interest as a lodging property. One of skill in the art may understand that such references are intended for illustration only and are not intended to limit the scope of the disclosed embodiments.

As discussed in greater detail below with respect to FIGS. 3A-3C, the templates 104 may include electronic documents organized into sections which include paragraphs. Content is generated for paragraphs from paragraph templates. The paragraph templates are subdivided into sentence types which include sentence templates. The sentence templates may also include variables having attributes. The content generation service 102 generates content information in the language of the templates relevant to the item of interest. The paragraph templates, sentence templates and attributes may be hierarchically organized in order to provide a preferred order in which content is to be generated.

In certain embodiments, the templates 104 may be obtained from a data store 110 in communication with the content generation service 102 via a network 112. Those skilled in the art will appreciate that the network 112 may be any wired network, wireless network or combination thereof. In addition, the network 112 may be a personal area network, local area network, wide area network, cable network, satellite network, cellular telephone network or combination thereof. Protocols and components for communicating via the Internet or any of the other aforementioned types of communication networks are well known to those skilled in the art of computer communications and thus need not be described in more detail herein.

The content generation service 102 may be embodied in a plurality of computing components, each executing an instance of the content generation service 102. A server or other computing component implementing the content generation service 102 may include a network interface, memory, processing unit, and computer-readable medium drive, all of which may communicate with each other by way of a communication bus. The network interface may provide connectivity over the network 112 and/or other networks or computer systems. The processing unit may communicate to and from a memory containing program instructions that the processing unit executes in order to operate the content generation service 102. The memory generally includes RAM, ROM, and/or other non-transitory, persistent and auxiliary memory.

It will be recognized that many of the components described herein are optional and that embodiments of the operating environment 100 may or may not combine components. Additionally, the components need not be distinct or discrete. Components may be reorganized in the operating environment 100. The operating environment 100 may be represented in a single physical server containing all of the subsystems described below or, alternatively, may be split into multiple physical servers. For example, in certain embodiments, the content generation service 102 may be implemented as a network-based service offering a variety of travel services and search capabilities (e.g., a travel website). In alternative embodiments, the content generation service 102, may include a stand-alone service.

Figure 2:
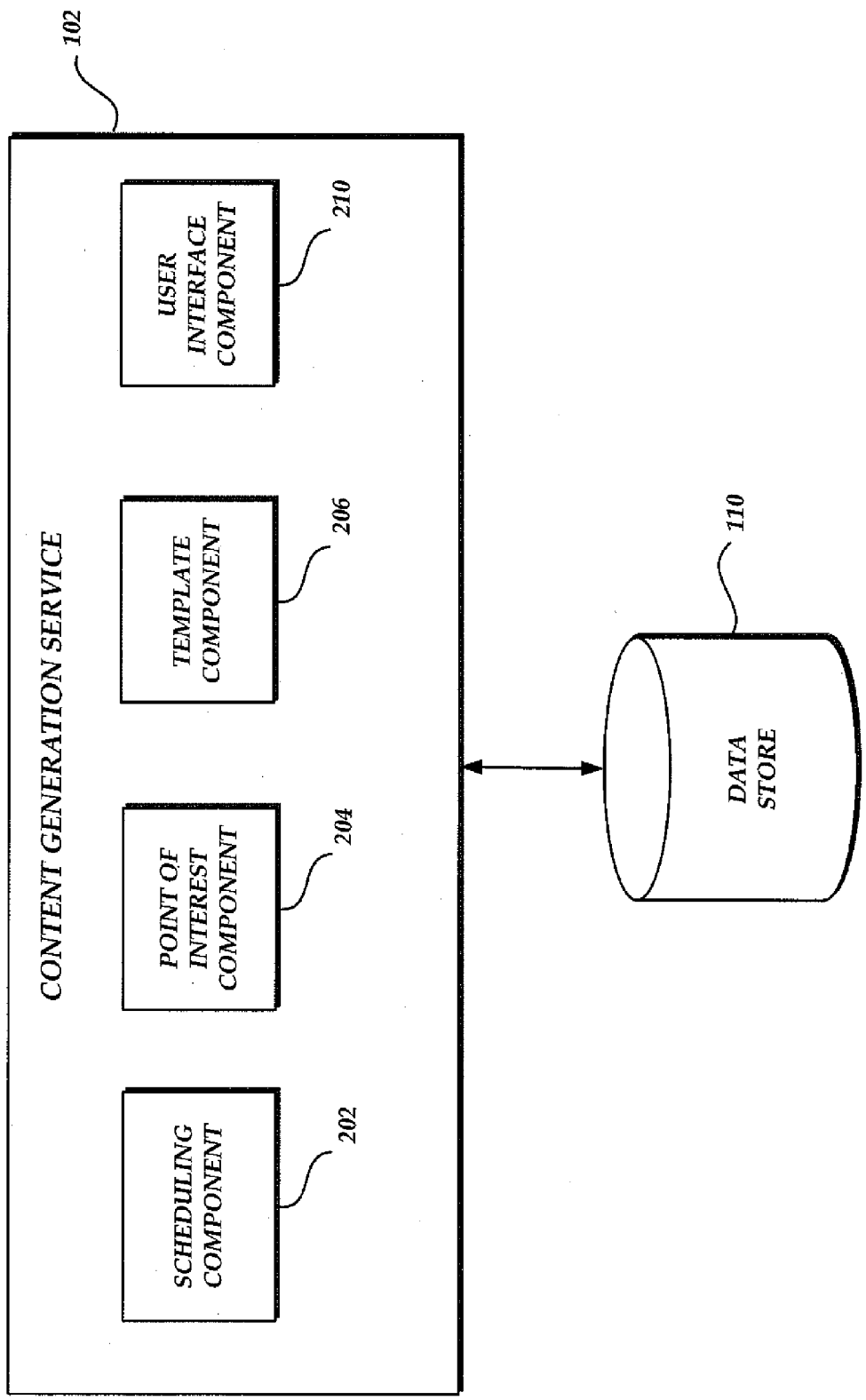
FIG. 2 is a block diagram of certain illustrative components implemented by the content generation service shown in FIG. 1.

With reference to FIG. 2, illustrative components of the content generation service 102 for use in generating content for an item of interest such as that described above will now be addressed. In one embodiment, the content generation service 102 may include a scheduling component 202 for identifying when content generation is to be performed. In certain embodiments, the scheduling component 202 may locally or remotely retrieve a timetable of dates and/or times at which content generation is to be performed by the content generation service 102. The scheduling component 202 may further identify an item of interest for which content generation is to be performed from the retrieved timetable.

In one embodiment, the identified item of interest may include a lodging property. The identified lodging property may be submitted to a point of interest component 204 by the scheduling component 202. In response to receipt of the identified lodging property, the point of interest component 204 may retrieve point of interest information and the location of the identified property (e.g., latitude and longitude) from a storage device local to the content generation service 102 or a network-accessible storage device, such as data store 110. The point of interest information may include information that may be of interest to a visitor to the identified property. Examples may include, but are not limited to, public and private attractions such as museums, landmarks, historical sites, zoos, amusement parks, parks, reoccurring and non-reoccurring events, shopping, transportation centers (e.g., airports, rental car locations, and bus, train, and light rail terminals), and the like.

The point of interest component 204 may then employ the point of interest information and location information to determine the closest points of interest to the identified lodging property. In one embodiment, the closest points of interest may be determined based upon geographic distance between respective points of interest and the identified lodging property. Those points of interest less than a selected distance from the identified lodging property may be determined to be closest points of interest. In another embodiment, the closest points of interest may be determined based upon time required to travel between respective points of interest and the identified lodging property. Those points of interest requiring less than a selected travel time from the identified property may be determined to be closest points of interest. One of skill in the art may appreciate that other methods of determining closest points of interest based upon the points of interest and the identified lodging property may be employed without limit. These closest points of interest may be saved to the data store 110, such as within the structured information, by the point of interest component 204 for later use by the content generation service 102 for content generation.

The content generation service 102 may further include a template component 206 for performing content generation. For example, continuing the example above, the template component 206 may also receive the identified lodging property from the scheduling component 202. Upon receipt of the identified lodging property, the template component 206 may obtain data corresponding to the identified property. The obtained data may include structured information regarding the identified lodging property. The obtained data may further include metadata that includes information specifying the language of the template, the section of the generated content to which the template is to pertain, and the paragraph of the template to which the obtained data is to be correlated. As discussed in greater detail below, the template component 206 may further employ the language, section, and paragraph information of the metadata to identify paragraph templates appropriate to the identified lodging property for retrieval.

The templates 104 and obtained data may each be independently stored locally by the content generation service 102 or may be retrieved remotely from a network accessible storage device, such as the data store 110. Non-limiting examples of paragraph templates and obtained data, including structured information and metadata corresponding to the identified property are illustrated in FIGS. 3A-3C and Tables 1-3 below.

Figure 3A:
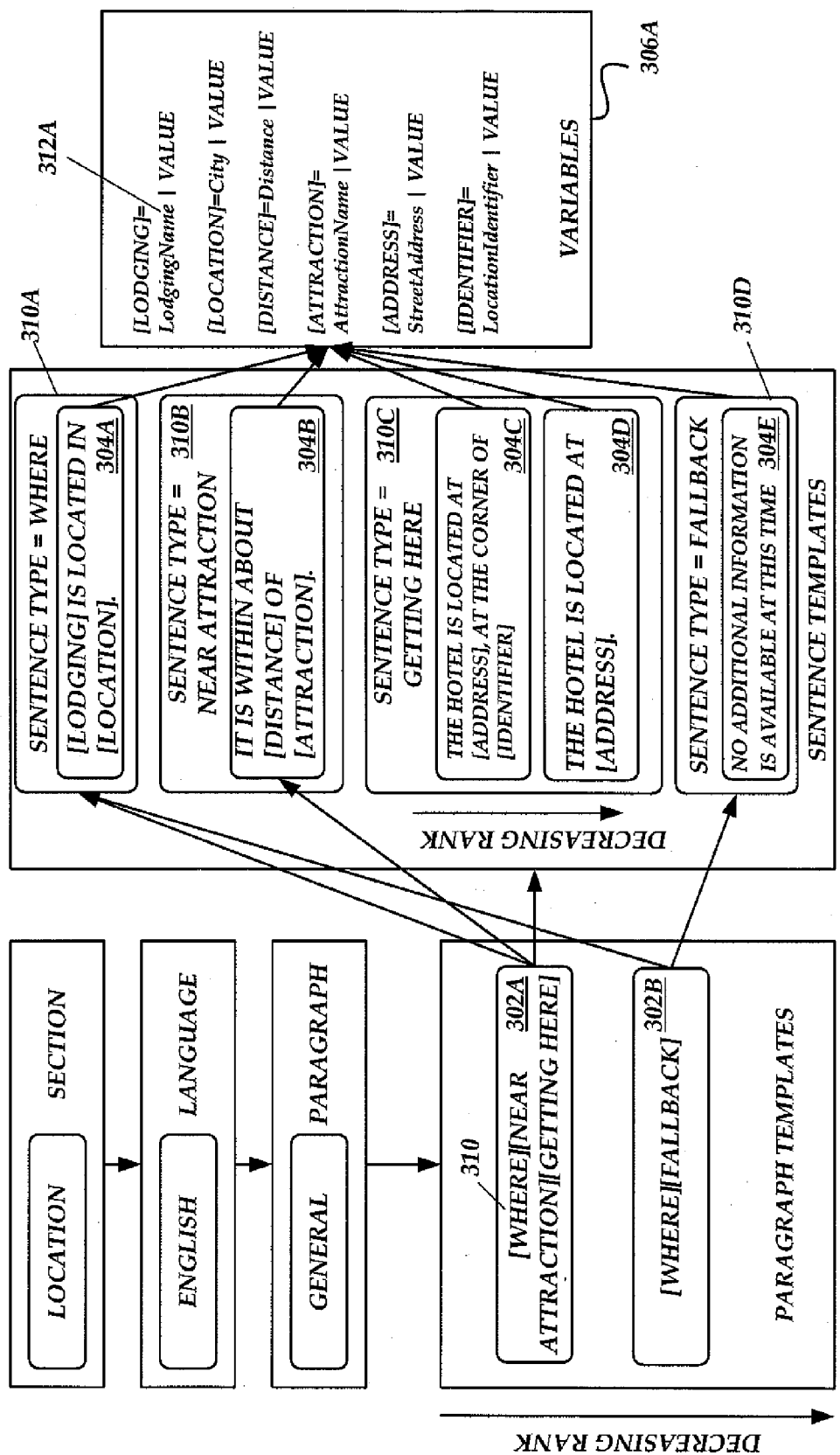
FIGS. 3A-3C are schematic illustrations of templates obtained by the content generation service for preparation of content regarding identified items of interest.

In the example of FIG. 3A, paragraph templates, such as paragraph templates 302A, 302B, are illustrated for a location section of a document regarding a lodging property. The paragraph templates 302A, 302B, may also include sentence types, such as sentence types 310A-310D. In general, paragraph templates may possess as few as one to as many sentence types as desired. The sentence types 310A-310D may further include sentence templates, such as sentence templates 304A-304E. In general, sentence types may include from as few as one sentence template to as many sentence templates as are desired. For example, the paragraph template 302A includes three sentence types, 310A-310C, [WHERE], [NEAR ATTRACTION] and [GETTING HERE], while the paragraph template 302B includes two sentence types, 310A and 310D, [WHERE] AND [FALLBACK].

Each of the paragraph templates 302A, 302B, sentence templates 304A-304E, and attributes 312 may be hierarchically ranked. The paragraph templates 302A, 302B are ranked within their respective section. For example, the paragraph templates 302A and 302B are ranked with respect to one another. Sentence templates 304A-304E are ranked with respect to one another within their respective sentence types 310A-310D. Attributes 312A are ranked with respect to one another within their respective variables 306A. Within a given paragraph, sentence type, or variable, the content generation service 102 may be configured to consider the respective paragraph templates, sentence templates, or attributes in order of their ranking. Furthermore, while sentence types 310A-310C within paragraph template 302A and sentence types 310D-310E within paragraph template 302B are not formally ranked with respect to one another within their respective paragraph templates, sentence types which are required may be selected for consideration prior to non-required sentence types, as discussed in greater detail below.

In certain embodiments, the ranking of the paragraph templates, sentence templates, and attributes may be determined by a ranking indicator (e.g., 1, 2, 3, etc.). For example, a ranking indicator may be associated with each of the respective paragraph templates, sentence templates, and attributes. The ranking indicator associated with each of respective paragraph templates, sentence templates, and attributes may be stored within the data store 110. In other embodiments, the ranking of selective ones of the paragraph templates, sentence templates, and attributes may be the same, indicating no preference between respective paragraph templates, sentence templates, and attributes.

Obtained data, including structured information and metadata corresponding to the paragraph templates 302A, 302B are illustrated below in Table 1. As illustrated in Table 1, the structured information includes columns for data, attributes, and attribute values. In certain embodiments, the structured information is designed to be searched in order to identify or match with the attributes 312A of the variables 306A of the sentence templates 304A-304E, as discussed below. In one example, with respect to Table 1, the sentence template 304A may possess a variable "Location." As illustrated in the variables 306A, the variable "Location" possesses an attribute "City." The variables 306A may further indicate that the "City" attribute is associated with an attribute value. As the attribute "City" is found in the data of the structured information, Table 1, the "Location" attribute may be identified as matching for the property (that is. the property satisfies the variable). Furthermore, since the "Location" attribute is indicated as being associated with an attribute value in variables 306A, the attribute value of "ABC, USA," within the structured information may be provided to replace the "Location" variable within the sentence template 304A.

TABLE 1

Structured Information and Metadata For Location Section

| Data | Attribute | Attribute Value |
|---|---|---|
| LodgingName | Y | XYZ Hotel |
| City | Y | ABC, USA |
| Distance | N | |
| AttractionName | N | |
| StreetAddress | Y | 12345 XYZ Street |

TABLE 1-continued

Structured Information and Metadata For Location Section

| Location Identifier | N | |
|---|---|---|

| Metadata | Attribute |
|---|---|
| Section | Location |
| Language | English |
| Paragraph | General |

The template component 206 may retrieve the structured information and metadata from a storage device which is local to the content generation service 102 and/or from a storage device which is accessible to the content generation service 102 via the network, such as the data store 110. The template component 206 may further employ the structured information and metadata for use in generating content for an electronic document based upon the template 104. An example of a generated electronic document 350 is illustrated in FIG. 3D.

The template component 206 may employ the metadata within the obtained data to facilitate content generation. The template component 206 may identify the section, language and paragraph for which content generation is to be performed. The template component 206 may further identify and retrieve the highest ranked paragraph template which is appropriate for the identified section, language, and paragraph of the property for content generation. In this manner, the metadata enables easy identification and retrieval of the desired paragraph template.

The template component 206 may begin generating content for a paragraph identified in the metadata of Table 1. The template component 206 may identify the highest ranked paragraph template for the paragraph, language, and section identified within the metadata. For example, as illustrated in FIG. 3A, a location section in English for a general paragraph is identified. The template component 206 initially retrieves and considers the identified highest ranked paragraph template for the paragraph under consideration. As discussed above, in this example, it is assumed that the highest ranked paragraph template is the paragraph template which is listed first for the paragraph under consideration, paragraph template 302A.

The template component 206 further attempts to generate content for sentence types within paragraph template 302A, with required sentence types evaluated prior to non-required sentence types in certain embodiments. As illustrated in FIG. 3A, the paragraph template 302A includes sentence types 310A-310C, [WHERE], [NEAR ATTRACTION], AND [GETTING HERE]. The first sentence type 310A includes a single sentence template which reads, "[LODGING] is located in the [LOCATION]," where [LODGING] and [LOCATION] are variables. The second sentence type 310B states, "It is within about [DISTANCE] of [ATTRACTION]," where [DISTANCE] and [ATTRACTION] are variables. The third sentence type 310C includes two sentence templates, "The Hotel is located at [ADDRESS], at the corner of [IDENTIFIER]" and "The Hotel is located at [ADDRESS]," where [ADDRESS] and [IDENTIFIER] are variables. From variables 306A of FIG. 3A, it may be observed that the variable "Address" corresponds to attribute "StreetAddress" while the variable "Identifier" corresponds to the attribute "Location Identifier." Furthermore, the variables 306A indicate that variables "Address" and "Identifier" are replaced by respective attribute values should they be satisfied by the structured information of Table 1.

It may be assumed in the present example that none of the sentence types 310A-310C within paragraph template 302A are required sentence templates. Thus, the sentence types 310A-310C are considered in an arbitrary order. Furthermore, the sentence templates 304A-304D may be ranked in the order in which they appear in their respective sentence types 310A-310C. Therefore, the first sentence template to be considered is sentence template 304A.

As discussed above, the variables within a selected sentence template may be considered in any order. For example, the template component 206 may begin by determining whether a match to the attributes of the variable "Lodging." is present within the structured information of Table 1. As illustrated in the variables 306A, the attribute associated with the "Lodging" variable is "LodgingName." As further illustrated in Table 1, the attribute "LodgingName" is present within the structured information for the lodging property. For example, the structured information includes a record for the attribute "LodgingName" and an indication "Y" within an Attribute column associated with "LodgingName" which specifies that the selected property possesses the "LodgingName" attribute. As a result, the template component 206 may determine the lodging property matches the "Lodging" variable of the sentence template 304A. Upon identifying a match between the "Lodging" variable and the structured information of Table 1, the template component 206 may replace the variable "LodgingName" with the corresponding attribute value "XYZ Hotel" in order to generate content. Alternatively, the template component 206 may wait until all variables within the sentence template 304A are satisfied before replacing the satisfied variables with their respective content.

The template component 206 may continue content generation with the next variable within the sentence template, "Location." As illustrated in variables 306A, the "City" attribute corresponds to the "location" variable. The "Location" variable is further indicated as being replaced by an attribute value when a match is identified. Thus, upon identifying a match for the "City" attribute within the structured information of Table 1, the attribute value "ABC, USA" may replace the "location" variable. In this manner, sentence type 310A may be completed.

The template component 206 continues the content generation process by considering another next sentence type of paragraph template 302A, for example, sentence type 310B, [NEAR ATTRACTION]. Sentence type 310B includes a single sentence template 304B which states, "It is within about [DISTANCE] of [ATTRACTION]," where [DISTANCE] and [ATTRACTION] are variables. The template component 206 determines whether the attributes of the variables "Distance" and "Attraction" are matched by the structured information of Table 1. As illustrated in the variables 306A, the variable "Distance" is associated with the attribute "Distance," while the variable "Attraction" is associated with the attribute "AttractionName." As further illustrated in Table 1, attributes corresponding to the attribute "Distance" and "AttractionName" are not present within the structured information.

Each variable within a sentence template is required to be found to be satisfied in order for the sentence template to be satisfied. Therefore, regardless of which variable of the sentence template 304B is considered first, "Distance" or "Attraction," failing to determine a match for either the attributes of the "Distance" or "Attraction" variables results in failure of the sentence template 304B. Therefore, content is not generated for the sentence template 304B and sentence template 304B is omitted from the generated document 350.

The template component 206 may subsequently consider the remaining sentence type 310C of the paragraph template 302A. Sentence type 304C includes two sentence templates 304C and 304D, which state, "The hotel is located at [ADDRESS], near the corner of [IDENTIFIER]" and "The hotel is located at [ADDRESS]," where [ADDRESS] and [IDENTIFIER] are variables. As illustrated in variables 306A, the "Address" variable is associated with the "StreetAddress" attribute, while the "Identifier" attribute is associated with the "LocationIdentifier" attribute. As further illustrated in the variables 306A, each of these attributes is replaced by an attribute value, should a match with the structured information be identified.

The structured information of Table 1 includes an attribute corresponding to the "StreetAddress" attribute but does not include an attribute corresponding to the "LocationIdentifier" attribute. Because at least one attribute 312 of one variable of the sentence template 304C is not matched by the structured information of Table 1, the template component 206, may determine that the sentence template 304C is not satisfied by the property and may move to consider the next highest ranked sentence template within the sentence type 310C, sentence template 304D.

Sentence template 304D reads "The hotel is located at [ADDRESS]." As discussed above, the structured information of Table 1 matches the "StreetAddress" attribute of the "Address" variable and has an attribute value of 12345 XYZ street. As the "address" variable is the only variable within sentence template 304D, the sentence template 304D is satisfied by the property. Therefore, the template component 206 may replace the variable "Address" with the attribute value "12345 XYZ" in the generated document 350.

Upon completion of the sentence type 310C, the template component 206 searches for additional sentence types within the paragraph template 302A to consider. Upon determining that there are no additional sentence types within the paragraph template 302A to consider, the template component 206 determines that the paragraph 302A has been satisfied, as at least one sentence type within the paragraph template 302A has been satisfied. Because the highest ranked paragraph template 302A of the location section is satisfied, the next highest ranked paragraph template of the location section, paragraph template 302B, is not considered for content generation. The template component 206 then considers the location section complete and moves to consider paragraph templates remaining within other sections of the document for which content is being generated.

Figure 3B:
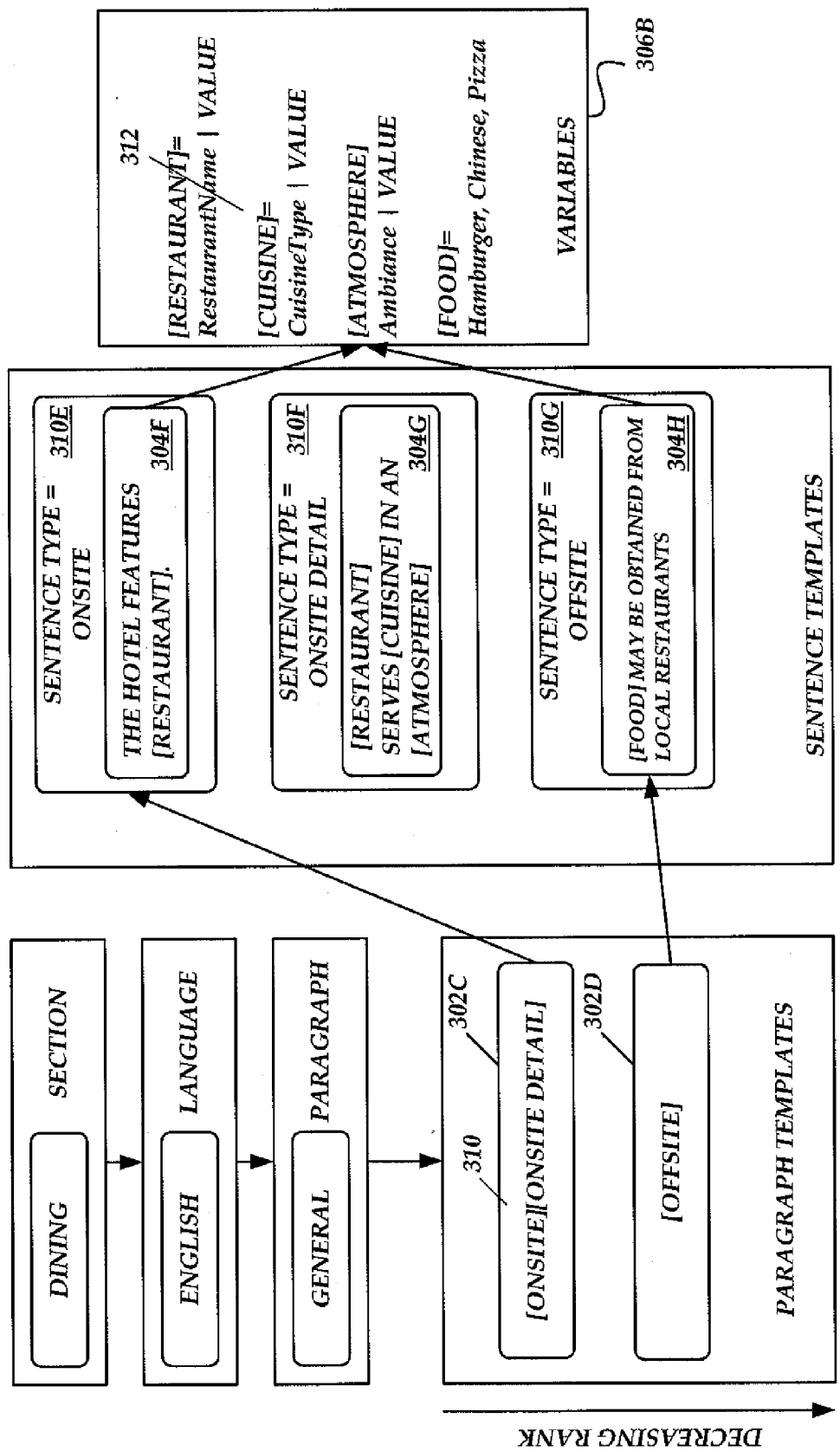
Figure 3C:
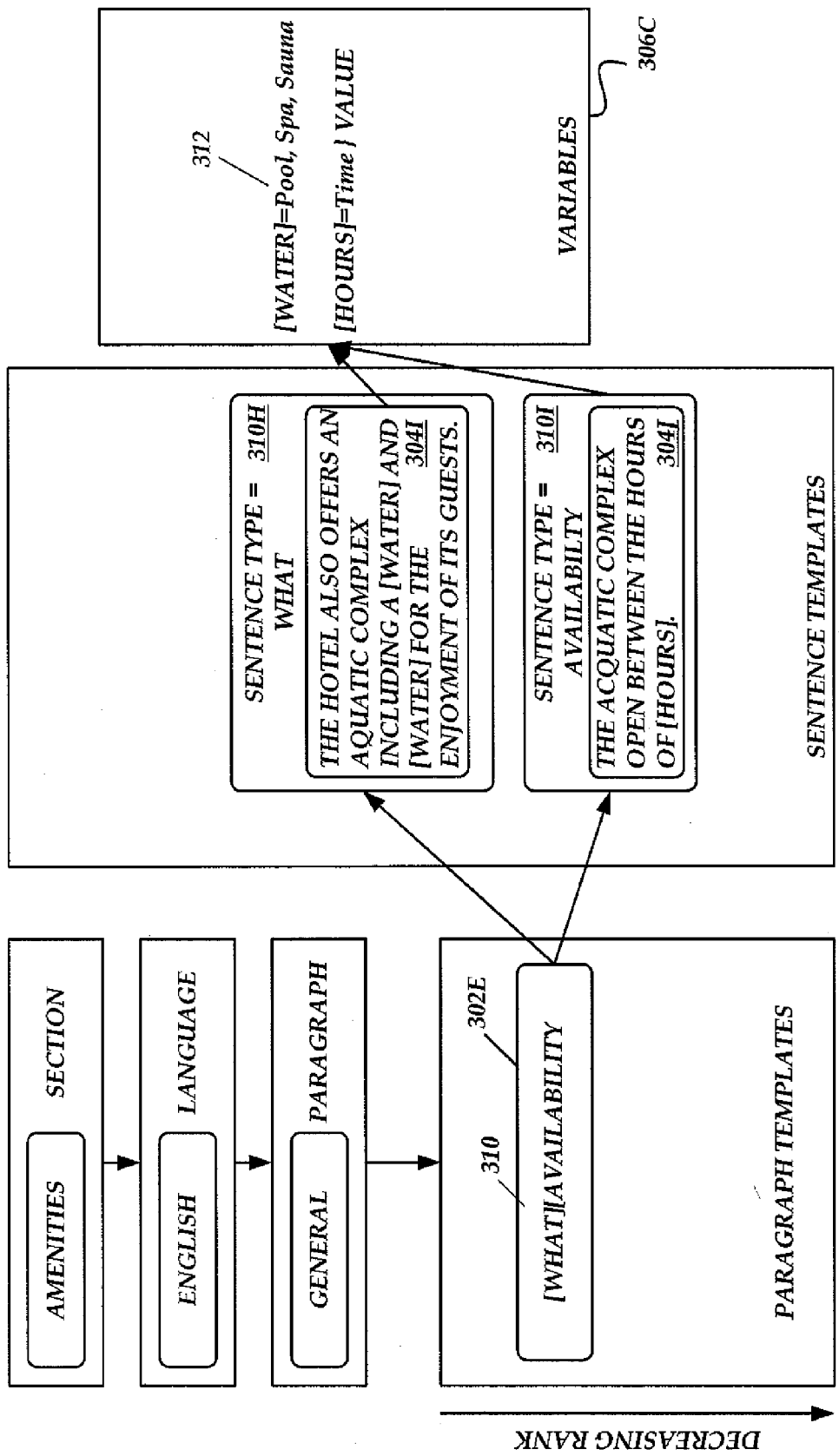

For example, the template component 206 may consider a dining section following completion of the location section, FIG. 3B. To perform content generation, the template component 206 may determine that structured information corresponding to the dining section is contained within Table 2 from the section field of the metadata of Table 2. Table 2 may have previously been retrieved concurrently with the structured information of Table 1 for the property, enabling the template component 206 to identify that content generation is to be performed for the dining section. As discussed above, the template component 206 may first consider the highest ranked paragraph template in the dining section. For this example, it may be assumed that paragraph template 302C is the highest ranked paragraph template, followed by paragraph template 302D.

TABLE 2

Structured Information and Metadata For Dining Section

| Data | Attribute | Attribute Value |
|---|---|---|
| Restaurant Name | Y | Yum! |
| CuisineType | N | |
| Ambiance | N | |
| Hamburger | Y | n/a |
| Chinese | N | |
| Pizza | Y | n/a |

| Metadata | Attribute |
|---|---|
| Section | Dining |
| Language | English |
| Paragraph | General |

Paragraph template 302C includes two sentence types, 310E and 310F, [ONSITE] and [ONSITE DETAIL]. As further illustrated in FIG. 3B, the sentence types 310E and 310F each include a single sentence template, 304F and 304G which state, "The hotel features [RESTAURANT]" and "[RESTAURANT] serves [CUISINE] in a [ATMOSPHERE]," where "Restaurant," "Cuisine," and "Atmosphere" are variables. It may be further observed from the variables 306B that the "Restaurant" variable is associated with an attribute "RestaurantName," the "Cuisine" variable is associated with an attribute "CuisineType," and the "Atmosphere" variable is associated with an attribute "Ambiance." Each of these variables is further indicated in the variables 306B as being replaced by an attribute value upon identification of a match with the structured information of the property. In this example, it may be assumed that sentence type 310F is a required sentence type. As the sentence type 310F is a required sentence type, the template component 206 may evaluate it prior to other sentence types (e.g., sentence type 310E) within the paragraph template 302C.

It may be observed from Table 2 and variables 306B that neither of the attributes of "CusineType" or "Atmosphere" contained within sentence template 304G of sentence type 310F match the attributes of the structured information. As a result, sentence template 304G is not found to be satisfied. The absence of at least one satisfied sentence template within the required sentence type 310F results in omission of the paragraph template 302C from the generated document 350, despite any other sentence types within the paragraph template 302C which may be satisfied, such as sentence type 310E.

As the paragraph template 302C is eliminated from consideration for content generation, the template component 206 may move to consider paragraph template 302D for content generation. As paragraph template 302D is composed of a single sentence type, sentence type 310G, which includes a single sentence template 304H, by default, sentence template 304H is considered first.

The sentence template 304H states, "[FOOD] may be obtained from local restaurants," where "Food" is a variable. From variables 306B, it may be observed that variable "Food" is associated with attributes "Hamburgers," "Chinese," and "Pizza." It may be assumed that the attributes are ranked from highest to lowest in the order they are listed in the variables 306B. As the variable "Food" appears once within the sentence template 304H, the sentence template 304H may be satisfied if at least one of "Hamburgers," "Chinese," and "Pizza" match the attributes of the property. When determining whether a match between the variable "Food" and the attributes of the structured information of Table 2 is present, the attributes of "Food" may be considered in ranked order. Thus, the template component 206 may first determine whether a match to the "Hamburgers" attribute is present. If not, then the template component 206 may determine whether a match to the "Chinese" attribute is present. If not, then the template component 206 may determine whether a match to the "Pizza" attribute is present. It may be further observed that the attributes "Hamburgers" and "Pizza" of the variable "Food" are matched in the structured data of Table 2. As the attribute "Hamburgers" is highest ranked and considered before the "Pizza" attribute, "Hamburgers" may be selected to replace the "Food" variable within the sentence template 304H. Furthermore, as the "Food" variable is the only variable which requires content generation within the paragraph template 302D, matching the "Food" variable completes content generation for the dining paragraph template 302D. Additionally, as the paragraph template 302D is the only remaining paragraph template within the dining section, completing the paragraph template 302D also completes the dining section.

Upon completing content generation for the dining section, the template component 206 moves to consider any remaining sections for the document 350. Assume that an amenities section remains for consideration. In one aspect, the template component 206 may obtain the structured information of Table 3 for the property. The template component 206 may further determine the paragraph templates appropriate to the amenities section from the metadata of Table 3.

TABLE 3

Structured Information and Metadata For Amenities Section

| Data | Attribute | Attribute Value |
|---|---|---|
| Pool | Y | n/a |
| Spa | Y | |
| Sauna | N | |
| Time | Y | 6 AM to 10 PM |

| Metadata | Attribute |
|---|---|
| Section | Amenities |
| Language | English |
| Paragraph | General |

The template component 206 may first determine the highest ranked paragraph template within the amenities section, followed by selecting a sentence type, or a required sentence type, and then considering the highest ranked sentence template within the selected sentence type. As paragraph template 302E is the only paragraph template, by default, paragraph template 302E is selected as the highest ranked. The paragraph template 302E includes two sentence types 310H and 310I, [WHAT] and [AVAILABILITY]. The sentence types 310H and 310I state, "The Hotel also offers an aquatic complex including a [WATER] and [WATER] for the enjoyment of its guests" and "The aquatic complex is open between the hours of [HOURS]," where "Water" and "Hours" are variables. As illustrated in the variables 306C of FIG. 3C, the "Water" variable corresponds to the attributes "Pool," "Spa,' and "Sauna," while the variable "Hours" corresponds to the attribute "Time." The attributes of the "Water" variable may be further ranked from highest to lowest in the order in which they appear in the variables 306C, with the "Pool" attribute as the highest ranked attribute and the "Sauna" attribute as the lowest ranked attribute. The variables 306C further indicate that the name of the attributes of the "Water" variable are used to replace the "Water" variable when a match is identified with the structured information of Table 3, while an attribute value corresponding to the attribute "Time" is used to replace the "Hours" variable when a match is identified with the structured information of Table 3.

Assuming that the sentence type 310H is required, the template component 206 may begin content generation for paragraph template 302D with sentence type 310H. As sentence type 310H contains only one sentence template, sentence template 310I, this sentence template is considered first by default. It may be noted that the "Water" variable appears twice within sentence template 310I, indicating that two attributes of the "Water" variable must match the attributes of the structured information of Table 3 for sentence template 310I to be satisfied. As discussed above, the template component 206 may consider the attributes in ranked order. For example, the template component 206 may first determine that the "Pool" attribute of the "Water" variable is matched by the attributes of the structured information of Table 3. As a result, the attribute "Pool" may replace the first instance of the "Water" variable in sentence template 304I. The template component 206 may next determine that the "Spa" attribute of the "Water" variable is matched by the attributes of the structured information of Table 3. As a result, the attribute "Spa" may replace the second instance of the "Water" variable in sentence template 304I. Upon completing content generation for sentence template 304I, the sentence type 310H is also completed.

The template component 206 may further generate content for the remaining sentence type 310I within the paragraph template 302E, which is composed of sentence template 304J. Based upon the structured information of Table 3 and the variables 306C, the template component 206 may identify a match between the structured information and the "Time" attribute of the "Hours" variable. The attribute of "6 AM to 10 PM" within the structured information may be added to the sentence template 304J in replacement of the "Hours" variable. As the paragraph template 302E is the only paragraph template within the amenities section, completing the paragraph template 302E also completes the amenities section and the overall document 350. The completed document 350 is illustrated in FIG. 3D.

The content generation service 102 may further include a user interface component 210. The user interface component 210 may be employed to receive user requests for performing content generation. The user interface component 210 may further generate user interfaces which enable submission of such user requests. The user interface component 210 may further generate user interfaces which enable submission of one or more of structured information, metadata, and templates 104 for use in content generation.

FIG. 4A is a block diagram of the operating environment of FIG. 1, illustrating the content generation service 102 initiating a content generation process for a lodging property. In certain embodiments, the request may be automatically initiated by the scheduling component 202 according to a predetermined schedule which is stored locally to the content generation service 102 or remotely in a network-accessible storage device (e.g., data store 110). The predetermined schedule initiated by the scheduling component 202 may include identification of the lodging property.

Upon identification of the lodging property by the scheduling component 202, the content generation service 102 may obtain data (e.g., structured information and metadata) regarding the lodging property. The structured information and metadata may be stored locally to the content generation service 102 or may be requested from a network-accessible storage device remote such as the data store 110. The obtained data may further include information regarding points of interest related to the identified lodging property.

The point of interest component 204 may employ at least a portion of the received point of interest information in order to identify closest points of interest to the identified lodging property. In one aspect, the point of interest component 204 may obtain location information regarding the identified lodging property, such as latitude and longitude, GPS coordinates, and the like. In combination with the point of interest information, the closest points of interest to the identified property may be determined. For example, algorithm-based criteria may be used for determining the closest points of interest.

The determined closest points of interest may be transmitted to the template component 206. The template component 206 may further employ the identified lodging property and metadata to determine one or more appropriate templates 104 (e.g., templates for a selected document section and written in a selected language) for which content generation is to be performed in order to provide a document. The templates 104 may be stored locally to the content generation service 102 or may be requested from a network-accessible storage device remote such as the data store 110. With the obtained template, structured information, and metadata, the template component 206 may generate content as discussed above with respect to FIG. 3. Content generated in this manner may be subsequently stored in the data store 110 for later retrieval and use.

Figure 4B:
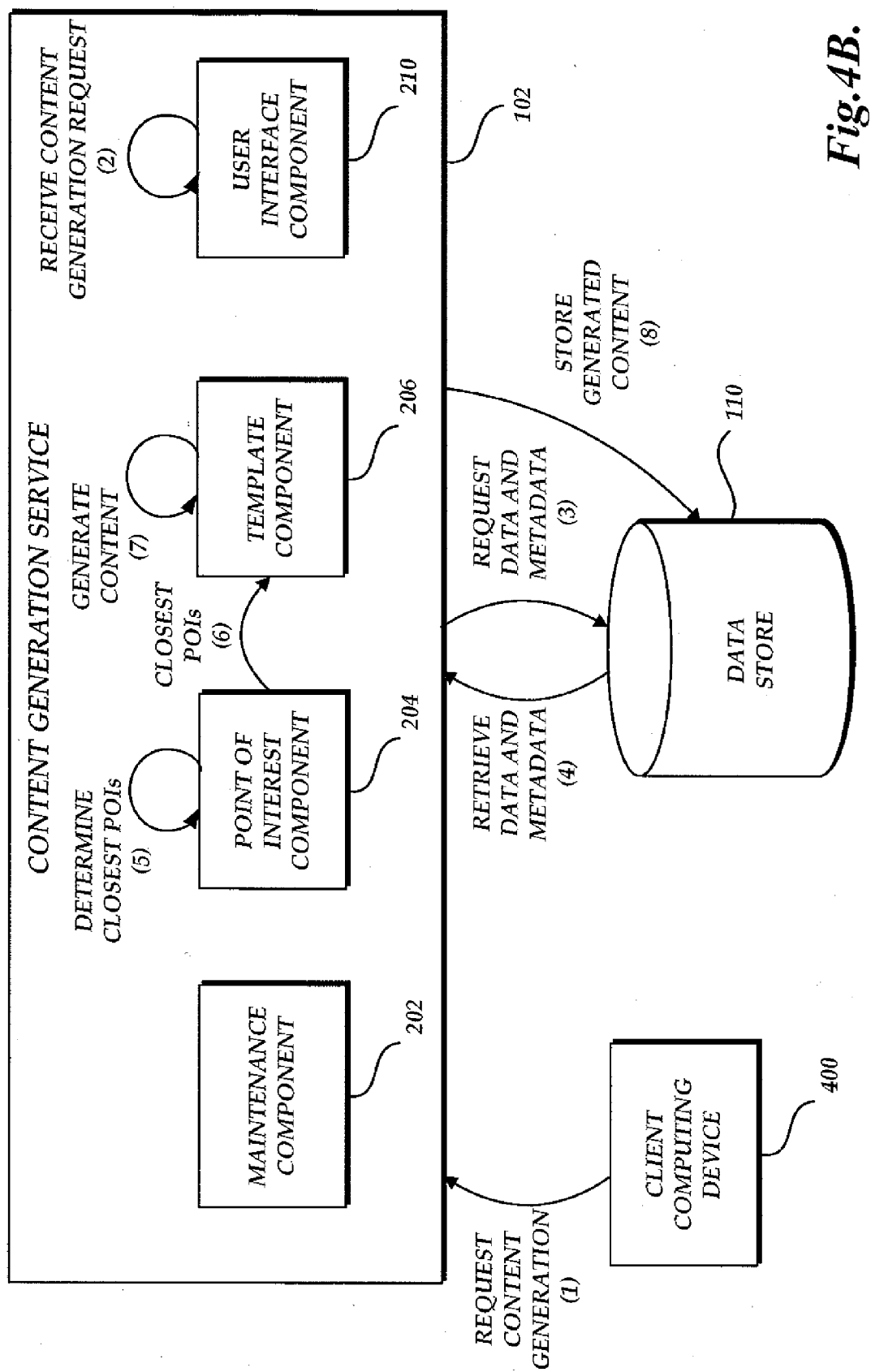
FIG. 4B is a block diagram of the operating environment of FIG. 1 illustrating the content generation service receiving a request to generate content regarding an identified item of interest.

In an alternative embodiment, illustrated in FIG. 4B, the content generation service 102 may receive a request to generate content from a client computing device 400. The client computing device 400 may include any communication device capable of communicating with the content generation service 102, such as a personal computer (PC), a kiosk, a thin client, a home computer, and a dedicated or embedded machine. Further examples may include without limitation laptop or tablet computers, personal computers, personal digital assistants (PDAs), hybrid PDAs/mobile phones, mobile phones, electronic book readers, set-top boxes, and the like.

FIG. 4B is a block diagram of the operating environment of FIG. 1, illustrating the submission of a request to the content generation service 102 from the client computing device 400 to generate content for a lodging property. The content generation request may include, but is not limited to, identification of the lodging property. The content generation request may be further received by the user interface component 210 and passed to the point of interest component 204. The block diagram of FIG. 4B is otherwise similar to FIG. 4A as described above.

Figure 5:
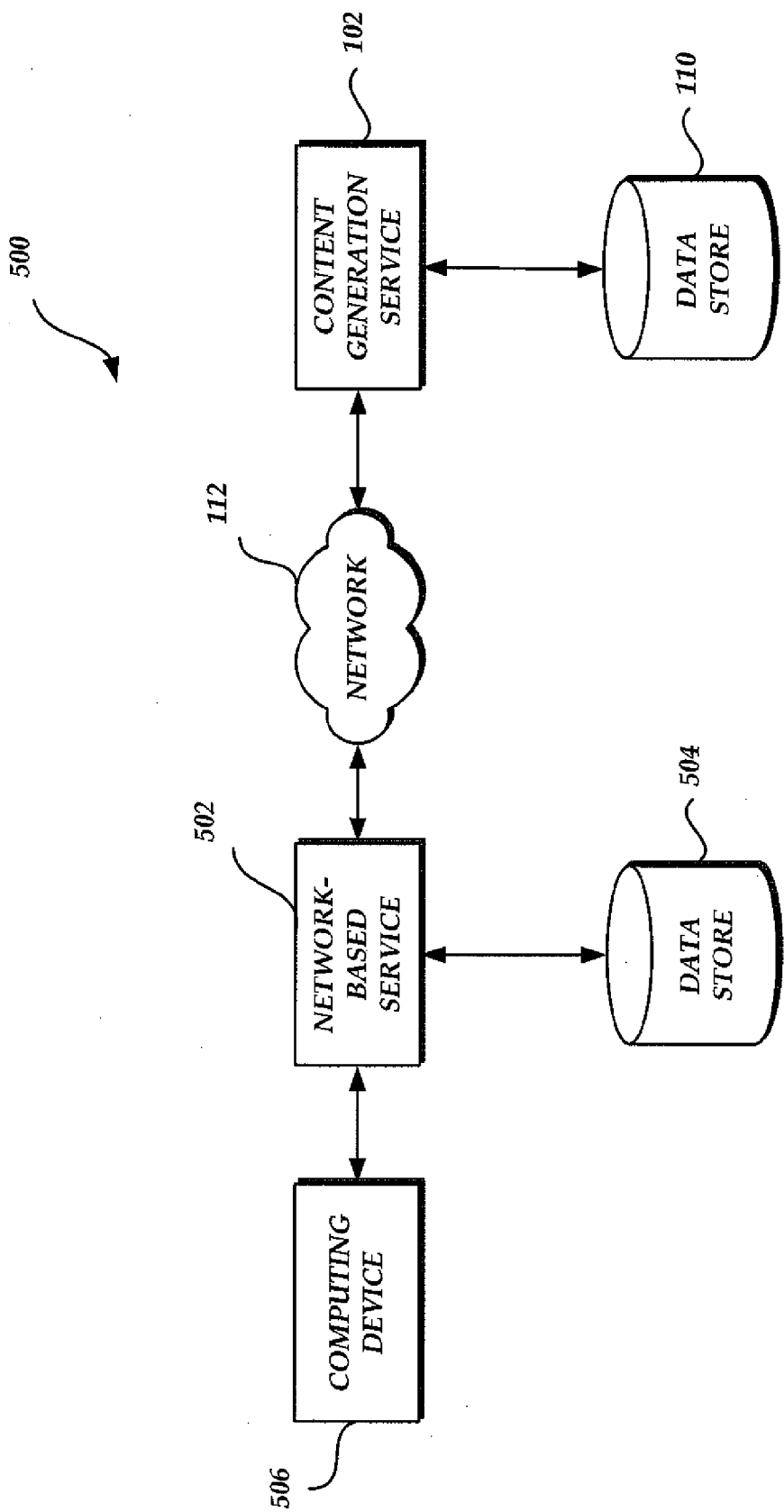
FIG. 5 is a block diagram of the operating environment of FIG. 1 in which the content generation service is in communication with a network-based service for providing generated content in response to a request.

FIG. 5 is a block diagram of an operating environment 500 in which the content generation service 102 is in communication with one or more network-based services 502. In one embodiment, the network-based service 502 may include one or more network-based retail services implemented via a website that offer one or more items for sale. In another embodiment, the network-based services 502 may include one or more network-based information services implemented via a website that offer information for review and/or purchase. Content generated by the content generation service 102 may be stored by the network-based service 502 in a data store 504. The content may be further displayed in conjunction with the item of interest when offered for review and/or sale by the network-based service 502.

For example, a user may employ a computing device 506 to communicate with the network-based service 502 to request information regarding a lodging property, including content generated by the content generation service 102. The user may further employ the network-based service 502 to purchase use of the lodging property. As discussed above, it may be understood that the content generation service 102 and network-based service 502 need not be separate components but instead may be incorporated within a single service.

The computing device 506 may include any communication device capable of communicating with the content generation service 102, such as a personal computer (PC), a kiosk, a thin client, a home computer, and a dedicated or embedded machine. Further examples may include, without limitation, laptop or tablet computers, personal computers, personal digital assistants (PDAs), hybrid PDAs/mobile phones, mobile phones, electronic book readers, set-top boxes, and the like.

Figure 6:
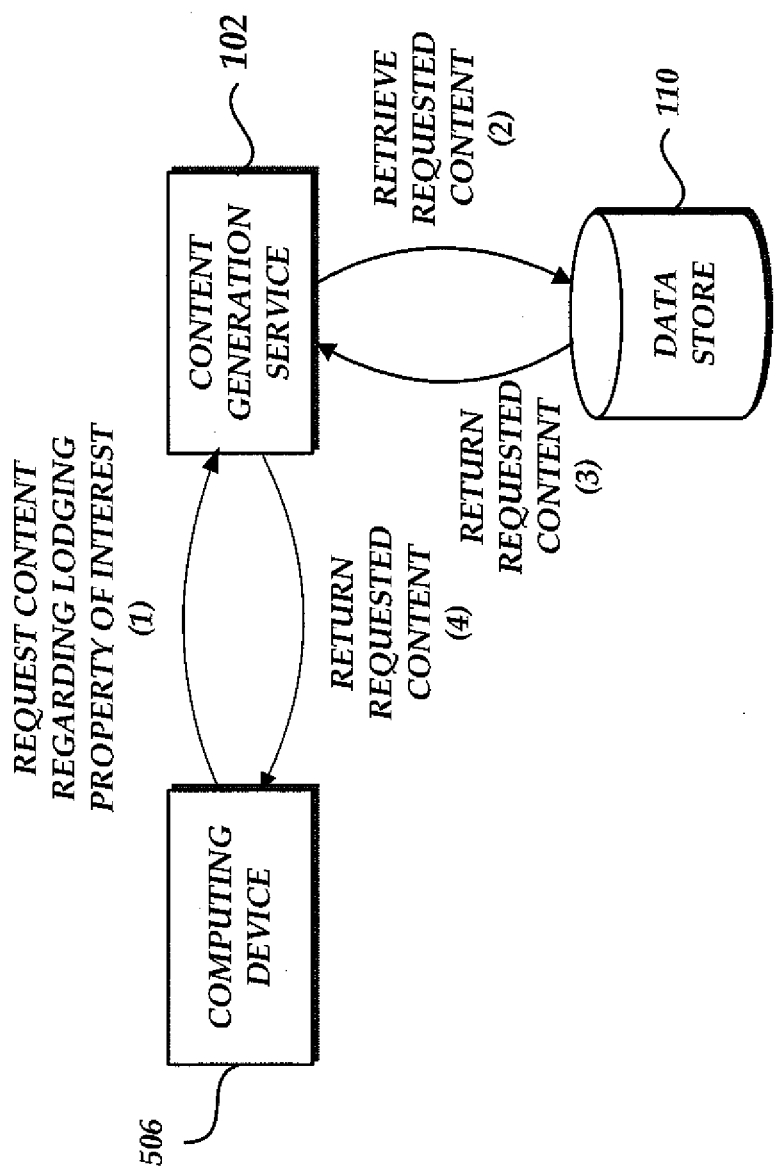
FIG. 6 is a block diagram of the operating environment of FIG. 5 illustrating submission of a request for content to the content generation service from a computing device.

FIG. 6 is a block diagram of the operating environment of FIG. 5, illustrating the submission of a request to the content generation service 102 from the computing device 506 for content regarding a lodging property. The content generation request may be received by the content generation service 102 from the computing device 506 via the network-based service 502 or may be received directly from the computing device 506. Upon receipt of the request for content regarding the lodging property, the content generation service 102 may retrieve the requested content, which had been previously generated by the content generation service 102. Retrieval may take place from storage local to the content generation service 102 or remotely from the content generation service 102, such as the data store 110. Upon retrieval, the requested content may be returned to the computing device 506.

In alternative embodiments, the content generation service 102 may also generate requested content upon receipt of the request, in lieu of retrieving the content from storage. The ability to generate requested content upon receipt of a request may be advantageous under circumstances where the requested content is not available within storage and/or the requested content retrieved from storage is found to be out of date. For example, retrieved content may be determined to be out of date if the time elapsed since its generation exceeds a selected time period (e.g., one month, three months, six months, one year, etc.).

Figure 7A:
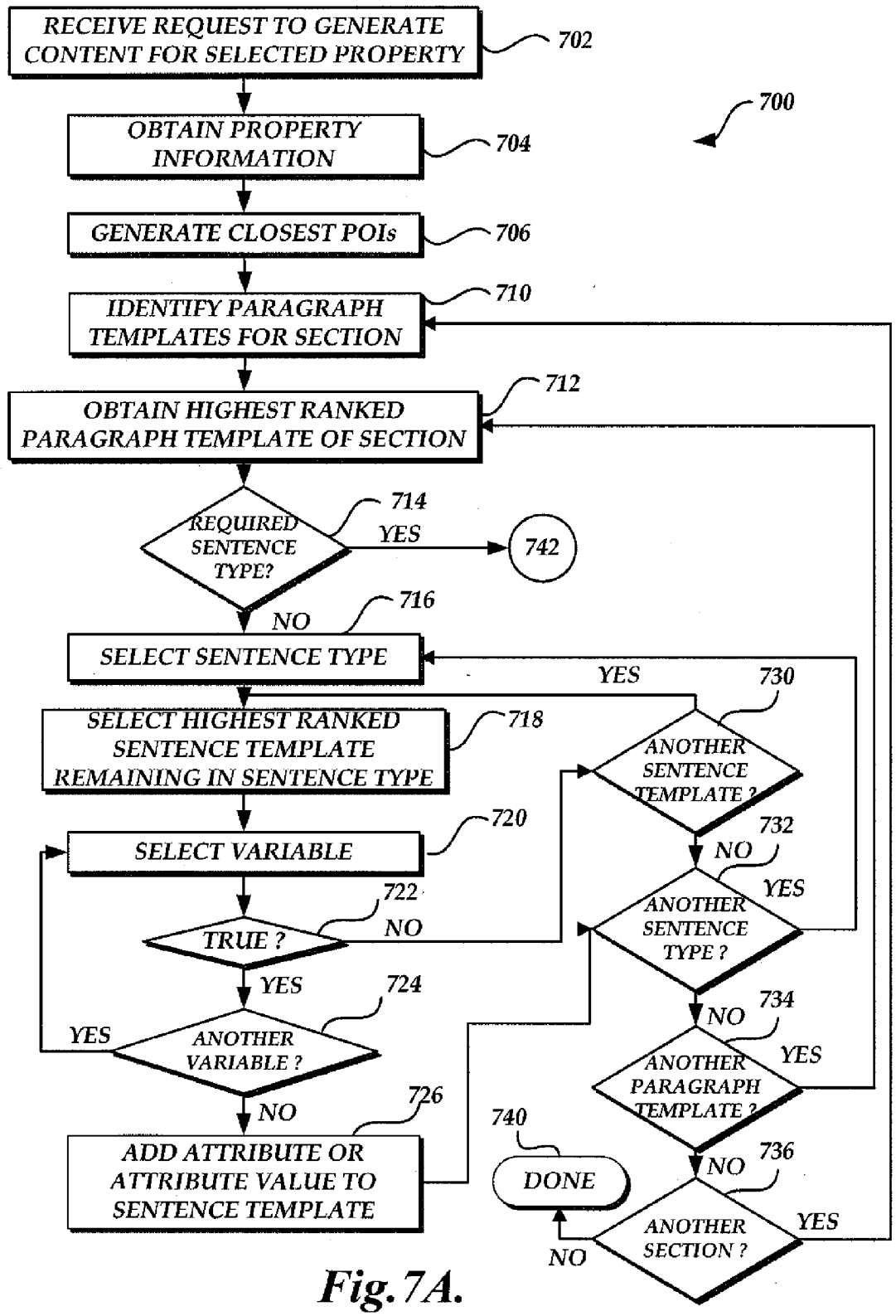
FIGS. 7A and 7B are a flow diagram of an illustrative routine implemented by the content generation service for preparation of content regarding an identified item of interest.

FIG. 7A is a flow diagram of an illustrative routine 700 implemented by the content generation service 102 to generate content for an item of interest, such as a lodging property. The routine 700 begins in block 702 in which the content generation service 102 obtains a request to generate content, which includes the lodging property of interest. The request may be generated internally by the content generation service 102, such as by the scheduling component 202 or from a user employing a client computing device 400.

Upon receipt of the request to generate content, property information is obtained in block 704. The property information may include structured information and metadata regarding the property of interest, including points of interest and location information. The content generation service 102 may employ the points of interest and location information to generate the closest points of interest to the lodging property of interest in block 706. The content generation service 102 may further employ the section and language information contained within the metadata to identify and retrieve the correct template for content generation for the lodging property in block 710. For example, the obtained template may identify the paragraph templates for the section, paragraph, and language identified in the metadata.

Once paragraph templates for the paragraph of the property of interest are identified, the content generation service 102 may further identify the hierarchy of the paragraph templates, sentence templates, and attributes (e.g., from the rankings within the data store). In block 712 the highest ranked paragraph template is identified and obtained. Subsequently, in block 714, a determination is made whether the paragraph template contains a required sentence type. If so, the routine 700 moves to block 742, as discussed below. If not, a sentence type is selected in block 716. In certain embodiments, any sentence type may be selected, as the sentence types are not ranked and all sentence types, absent a required sentence type, are considered. Upon selection of a sentence type, the highest ranked sentence template within the selected sentence type is selected in block 718. In alternative embodiments, only the highest ranked sentence template may be identified and retrieved, rather than all sentence templates of the paragraph template under consideration. In this manner, the number of sentence templates retrieved may be reduced.

In block 720, a variable within the selected sentence template is selected for content generation. In decision block 722, the content generation service 102 determines whether a match for one or more of the attributes of the selected variable is present in the structured information for the item of interest. If a match is identified (e.g., the variable is satisfied or "true"), the routine 700 moves to decision block 724 where a determination is made whether additional variables are present within the presently considered sentence template. If no match is identified (e.g., the variable is not satisfied or "true"), the routine 700 moves to decision block 730, where a determination is made whether another sentence template is present within the sentence type.

If a determination is made that there are no additional variables present within the sentence template, after all variables in the sentence template have been identified to be true, (e.g., the sentence template is also true), the routine 700 moves to block 726. In block 726, the attribute or attribute values associated with the variable is added to the sentence template and the routine 700 moves to decision block 732. It may be understood, in certain embodiments, that the attribute or attribute values associated with a variable identified to be satisfied or "true" may also be added to the sentence template immediately upon being identified to be satisfied or "true".

In decision block 732, a determination is made whether another sentence type requiring content generation is present within the paragraph template under consideration. If another sentence type requiring content generation is present within the paragraph template, the routine 700 returns to block 716. If, however, another sentence type needing content generation is not present within the paragraph template, the routine 700 moves to decision block 734. In decision block 734, a determination is made whether the paragraph template under consideration has been satisfied (e.g., content has been generated for the paragraph template) or if the next highest ranked paragraph template of the paragraph should be considered for content generation. If a selected paragraph template of the paragraph under consideration is not satisfied, another paragraph template may be considered in order to generate content for the paragraph. Thus, the routine 700 returns to block 712, where the highest ranked paragraph template remaining for the paragraph under consideration is selected and the routine 700 continues as described above with block 714.

If, however, it is determined in block 734 that content has been generated for the paragraph under consideration, and additional content generation is not needed for the paragraph, the routine 700 moves to decision block 736. In decision block 736, a determination is made whether another section requiring content generation is present If another section requiring content generation is present, the routine 700 returns to block 710, where paragraph templates for the section are identified and the routine 700 continues as described above with block 712.

Figure 7B:
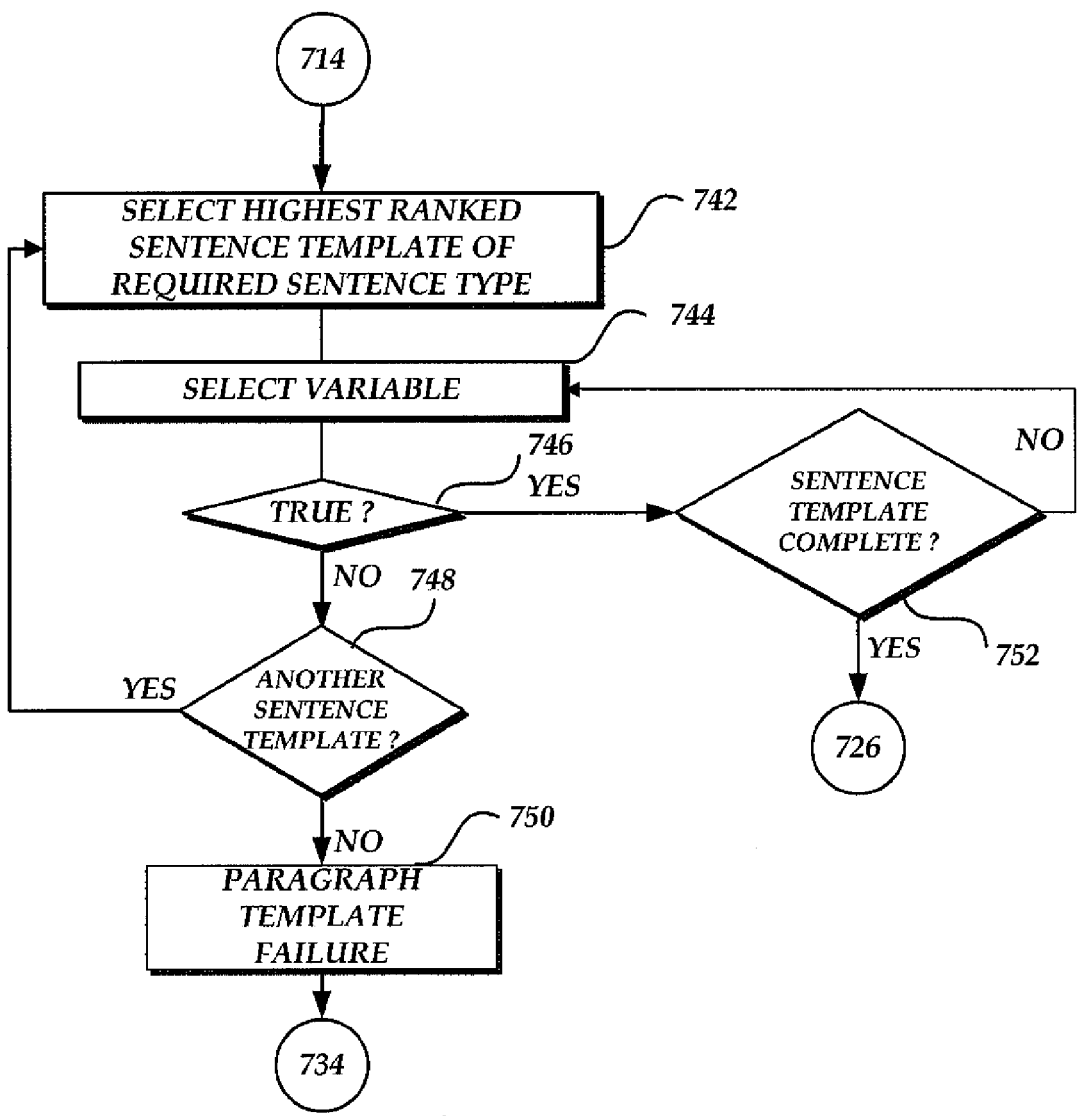

As discussed above, if a required sentence type is determined in decision block 714, the routine 700 moves to block 742 of FIG. 7B. In block 742, the highest ranked sentence template within the selected sentence type is selected and the routine 700 moves to block 744. In block 744, a variable within the selected sentence template is selected for content generation. In decision block 746, a determination is made whether a match is present for one or more of the attributes of the selected variable within the structured information for the item of interest. If a match is identified (e.g., the variable is satisfied or "true"), the routine 700 moves to decision block 752 where a determination is made whether the sentence template under consideration is complete. If the sentence template is complete, the routine 700 subsequently moves to block 726, where matching attribute or attribute values are added to the template for content generation. If the sentence template is not complete, the routine subsequently moves to block 744 where other variables within the sentence template are considered.

If, however, the variable is not found to be satisfied, the routine 700 moves to block 748. In decision block 748, a determination is made whether additional sentence templates are present within the required sentence type. If so, the routine 700 moves to block 742, where the highest ranked sentence template remaining in the sentence type is considered. If not, the routine 700 moves to block 750, where the paragraph under consideration is determined to fail. Paragraph failure in block 750 reflects the determination that content has not been generated for any sentence template within the required sentence type and that the sentence type is required. As a result, the entire paragraph within which the sentence type resides is found to be unsatisfied or "fails" and is omitted from the generated content.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method of electronically generating a document describing a property in different languages, the method comprising:
    under control of one or more configured computer systems;
        obtaining first data, wherein the first data comprises a set of attributes associated with the property;
        obtaining a content template for generation of content describing the property, the content template comprising:
            a plurality of paragraph templates, wherein each of the plurality of paragraph templates comprises one or more sentence types, and wherein the plurality of paragraph templates are ranked at least according to the desirability of using each paragraph template to generate content describing the property;
            a plurality of sentence templates, wherein each of the plurality of sentence templates corresponds to at least one of the one or more sentence types, wherein each of the plurality of sentence templates comprises one or more variables, and wherein the plurality of sentence templates are ranked at least according to the desirability of using each sentence template to generate content describing the property; and
            wherein the plurality of paragraph templates and the plurality of sentence templates are ranked independent of the set of attributes associated with the property;
        obtaining second data, the second data specifying the language of the template;
        identifying the highest ranked paragraph template of the plurality of paragraph templates based at least in part on the second data; for each sentence type of the identified paragraph template:
            identifying the highest ranked sentence template of the plurality of sentence templates that corresponds to the sentence type; and
            determining that each of the variables of the identified sentence template correspond to at least one of the set of attributes of the first data; and
        generating a document based at least in part on processing the identified paragraph template with at least a sub-set of the set of attributes.

2. The computer-implemented method of claim 1, wherein obtaining a content template for generation of content describing the property comprises:
    identifying a language specified within the obtained second data; and
    retrieving a content template for the property which is written in the identified language.

3. The computer-implemented method of claim 1, wherein the obtained first data comprises one or more of a property name, property amenities, a property rating, a property location, and points of interest associated with the property.

4. The computer-implemented method of claim 1, wherein the generated document does not include unsatisfied sentence templates, wherein an unsatisfied sentence template has at least one variable that does not correspond to an attribute within the set of attributes of the first data.

5. The computer-implemented method of claim 1, wherein one or more sentence types within the plurality of paragraph templates are designated as being required.

6. The computer-implemented method of claim 5, wherein the generated document does not include unsatisfied paragraph templates, wherein an unsatisfied paragraph template includes at least one sentence type corresponding to an unsatisfied sentence template, wherein an unsatisfied sentence template has at least one variable that does not correspond to an attribute within the set of attributes of the first data.

7. A system for automatically generating content for an electronic document, the system comprising:
- an electronic data store that stores one or more templates for the electronic documents, wherein the one or more templates comprise:
  - a plurality of paragraph templates for a document paragraph, each paragraph template comprising one or more sentence types, wherein the plurality of paragraph templates are ranked at least according to a desirability of using each paragraph template to generate content describing items of interest,
  - a plurality of sentence templates, each sentence template corresponding to at least one of the one or more sentence types and comprising one or more variables, wherein the plurality of sentence templates are ranked at least according to a desirability of using each sentence template to generate content describing, items of interest; and
- a content generation service implemented by one or more processors in communication with the electronic data store, the content generation service operative to:
  - obtain data regarding an item of interest to be described in the electronic document, the data comprising a set of attributes associated with the item of interest;
  - select a paragraph template which is to be employed for content generation from the data store based at least in part on the set of attributes and on rankings of the paragraph templates, wherein the ranking of the plurality of paragraph templates is independent of the set of attributes;
  - for each sentence type of the selected paragraph template, identify a sentence template of the plurality of sentence templates that corresponds to said sentence type based at least in part on a rank of the identified sentence template and on the set of attributes, wherein each of the variables of the identified sentence template correspond to at least one attribute of the set of attributes, and wherein the ranking of the plurality of sentence templates is independent of the set of attributes; and
  - generate the electronic document based at least in part on processing the selected paragraph template with at least a portion of the set of attributes.

8. The system of claim 7, wherein the item of interest comprises at least one of flights, lodging properties, ground transportation, and cruises.

9. The system of claim 7, wherein data regarding the item of interest comprises one or more of a property name, property amenities, a property rating, a property location, and points of interest associated with the property.

10. The system of claim 7, wherein the set of input attributes comprise at least one attribute type and at least one corresponding attribute value.

11. The system of claim 10, wherein the variables of the identified sentence template include an indicator specifying whether the sentence template variables are replaced by an attribute type or attribute value.

12. The system of claim 7, wherein selecting a paragraph template comprises:
- obtaining additional data identifying a desired language of the electronic document; and
- retrieving a paragraph template for the property which is written in the desired language.

13. The system of claim 7, wherein selecting a paragraph template comprises selecting the highest ranked paragraph template that may be used to generate a paragraph describing the item of interest based at least in part on the set of attributes.

14. The system of claim 7, wherein the generated electronic document does not include unsatisfied sentence templates, wherein an unsatisfied sentence template has at least one variable that does not correspond to an attribute within the set of attributes.

15. The system of claim 7, wherein one or more sentence types within the selected paragraph template are designated as being required.

16. The system of claim 15, wherein the generated document does not include unsatisfied paragraph templates wherein an unsatisfied paragraph template includes at least one sentence type corresponding to an unsatisfied sentence template, wherein an unsatisfied sentence template has at least one variable that does not correspond to an attribute within the set of attributes.

17. A computer-implemented method of electronically generating content for a document describing an item of interest, the method comprising:
- under control of one or more configured computer systems;
  - receiving a request to generate content for the item of interest;
  - obtaining data regarding the item of interest, the data including one or more attributes describing the item of interest for use in content generation and one or more languages for content generation;
  - identifying a template based at least in part upon the one or more languages for content generation and on the item of interest, wherein the template comprises:
    - a plurality of paragraph templates, each paragraph template comprising one or more sentence types, and
    - a plurality of sentence templates, each sentence template corresponding to at least one of the one or more sentence types and including one or more variables,
    - wherein the plurality of paragraph templates and the plurality of sentence templates are ranked at least according to a desirability of using each paragraph template and sentence template to generate content describing the item of interest, and wherein the ranking of the plurality of paragraph templates and the plurality of sentence templates is independent of the obtained data regarding the item of interest;
  - identifying a paragraph template of the plurality of paragraph templates based at least in part on the one or more attributes and on a ranking of the identified paragraph template;
  - for each sentence type of the selected paragraph template, identifying a sentence template of the plurality of sentence templates that corresponds to said sentence type based at least in part on a rank of the identified sentence template and on the set of attributes, wherein each of the variables of the identified sentence template correspond to at least one attribute of the set of attributes; and generating a document, based at least in part on processing the identified paragraph template with at least a portion of the one or more attributes.

18. The computer-implemented method of claim 17, wherein the item of interest comprises at least one of flights, lodging properties, ground transportation, and cruises.

19. The computer-implemented method of claim 17, wherein data regarding the item of interest comprises one or more of a property name, property amenities, a property rating, a property location, and points of interest associated with the property.

20. The computer-implemented method of claim 17, wherein the attributes of the obtained data comprise at least one attribute type and at least one corresponding attribute value.

21. The computer-implemented method of claim 20, wherein the plurality of sentence templates further include an indicator specifying whether each sentence template variables is replaced by an attribute type or attribute value.

22. The computer-implemented method of claim 17, wherein the generated document does not include unsatisfied sentence templates, wherein an unsatisfied sentence template has at least one variable that does not correspond to an attribute within the one or more attributes of the obtained data.

23. The computer-implemented method of claim 17, wherein one or more sentence types of the plurality of paragraph templates are designated as being required.

24. The computer-implemented method of claim 23, wherein the generated document does not include unsatisfied paragraph templates, wherein an unsatisfied paragraph template includes at least one sentence type corresponding to an unsatisfied sentence template, wherein an unsatisfied sentence template has at least one variable that does not correspond to an attribute within the one or more attributes of the obtained data.

25. A non-transitory computer-readable medium having instructions encoded thereon, wherein the instructions, when executed by a computing apparatus, cause the computing apparatus to:

control a template component operative to:
obtaining a set of attributes associated with an item of interest;
select a paragraph template of a plurality of paragraph templates for a paragraph describing an item of interest, wherein each paragraph template comprises one or more sentence types, wherein each sentence type corresponds to at least one of a plurality of sentence templates, wherein each sentence template comprises one or more variables, and wherein the plurality of paragraph templates and the plurality of sentence templates are ranked independent of the set of attributes and at least according to a desirability of using each paragraph template and sentence template to generate content describing the item of interest;

for each sentence type of the selected paragraph template, identify a sentence template of the plurality of sentence templates that corresponds to said sentence type based at least in part on a rank of the identified sentence template and on the set of attributes, wherein each of the variables of the identified sentence template correspond to at least one attribute of the set of attributes;
and
generate an electronic document based at least in part on processing the selected paragraph template with at least a portion of the set of attributes.

26. The non-transitory computer-readable medium of claim 25, wherein the item of interest comprises at least one of flights, lodging properties, ground transportation, and cruises.

27. The non-transitory computer-readable medium of claim 25, wherein set of attributes comprises one or more of a property name, property amenities, a property rating, a property location, and points of interest associated with the property.

28. The non-transitory computer-readable medium of claim 25, wherein the set of attributes comprises at least one attribute type and at least one corresponding attribute value.

29. The non-transitory computer-readable medium of claim 28, wherein the plurality of sentence templates include an indicator specifying whether the sentence template variables are replaced by an attribute type or an attribute value.

30. The non-transitory computer-readable medium of claim 25, wherein selecting a paragraph template comprises:
obtaining additional data identifying a desired language for the paragraph describing the item of interest; and
retrieving a paragraph template from the plurality of paragraph templates which is written in the desired language.

31. The non-transitory computer-readable medium of claim 25, wherein selecting the paragraph template comprises selecting the highest ranked paragraph template of the plurality of paragraph templates that may be used to generate a paragraph describing the item of interest based at least in part on the set of attributes.

32. The non-transitory computer-readable medium of claim 25, wherein the generated document does not include unsatisfied sentence templates, wherein an unsatisfied sentence template has at least one variable that does not correspond to an attribute within the set of attributes.

33. The non-transitory computer-readable medium of claim 25, wherein one or more sentence types of the plurality of paragraph templates are designated as being required.

34. The non-transitory computer-readable medium of claim 33, wherein the generated document does not include unsatisfied paragraph templates, wherein an unsatisfied paragraph template includes at least one sentence type corresponding to an unsatisfied sentence template, wherein an unsatisfied sentence template has at least one variable that does not correspond to an attribute within the set of attributes.

* * * * *